United States Patent
Harris

(10) Patent No.: US 11,434,176 B2
(45) Date of Patent: Sep. 6, 2022

(54) FUGITIVE FIBER COMMINGLING TO PROVIDE LOFT IN CERAMIC FIBER TOWS

(71) Applicant: Rolls-Royce High Temperature Composites Inc., Cypress, CA (US)

(72) Inventor: Stephen Harris, Long Beach, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 846 days.

(21) Appl. No.: 16/111,508

(22) Filed: Aug. 24, 2018

(65) Prior Publication Data

US 2019/0177240 A1   Jun. 13, 2019

Related U.S. Application Data

(60) Provisional application No. 62/597,129, filed on Dec. 11, 2017.

(51) Int. Cl.
*C04B 35/638* (2006.01)
*C04B 35/80* (2006.01)
(Continued)

(52) U.S. Cl.
CPC ............ *C04B 35/80* (2013.01); *B29C 70/18* (2013.01); *B29C 70/30* (2013.01); *B29C 70/36* (2013.01); *C04B 35/6225* (2013.01); *C04B 35/62236* (2013.01); *C04B 35/62245* (2013.01); *C04B 35/62272* (2013.01); *C04B 35/62281* (2013.01); *C04B 35/62884* (2013.01); *C04B 35/638* (2013.01); *D02G 3/04* (2013.01); *D02G 3/447* (2013.01); *D02J 1/08* (2013.01); *D02J 1/18* (2013.01); *D02J 13/00* (2013.01); *C04B 2235/5224* (2013.01); *C04B 2235/5228* (2013.01); *C04B 2235/5236* (2013.01);
(Continued)

(58) Field of Classification Search
CPC .. C04B 35/638; C04B 2235/614; D02G 3/04; D02G 3/447; D02J 1/08; D10B 2101/08; D10B 2505/02
USPC .......................................................... 264/42
See application file for complete search history.

(56) References Cited

U.S. PATENT DOCUMENTS 4,375,779 A * 3/1983 Fischer .................... D02G 3/16
428/366
5,147,721 A   9/1992 Baron et al.
(Continued)

FOREIGN PATENT DOCUMENTS

JP       2000034619 A  *  2/2000

*Primary Examiner* — Jeffrey M Wollschlager
*Assistant Examiner* — Xue H Liu
(74) *Attorney, Agent, or Firm* — Crowell & Moring LLP

(57) ABSTRACT

A method of making a ceramic fiber tow and the system regarding the same may be included. The method may include commingling a plurality of ceramic fibers with a fugitive fiber to form a single ceramic fiber tow. The fugitive fiber may be positioned between at least two ceramic fibers included in the single ceramic fiber tow. The method may further include forming a porous ceramic preform including at least the single ceramic fiber tow. The method may further include removing the fugitive fiber from the ceramic fiber tow leaving a space between at least two ceramic fibers of the single ceramic fiber tow. The method may further include replacing the spaces between ceramic fibers included in the ceramic fiber tows with a ceramic matrix.

11 Claims, 5 Drawing Sheets

(51) Int. Cl.
*D02G 3/44* (2006.01)
*D02J 13/00* (2006.01)
*D02J 1/08* (2006.01)
*C04B 35/622* (2006.01)
*C04B 35/628* (2006.01)
*D02G 3/04* (2006.01)
*B29C 70/18* (2006.01)
*D02J 1/18* (2006.01)
*B29C 70/30* (2006.01)
*B29C 70/36* (2006.01)

(52) U.S. Cl.
CPC ............. *C04B 2235/5244* (2013.01); *C04B 2235/5248* (2013.01); *C04B 2235/5252* (2013.01); *C04B 2235/614* (2013.01); *D10B 2101/08* (2013.01); *D10B 2101/12* (2013.01); *D10B 2321/06* (2013.01); *D10B 2321/12* (2013.01); *D10B 2331/04* (2013.01); *D10B 2331/06* (2013.01); *D10B 2505/02* (2013.01)

(56) References Cited

U.S. PATENT DOCUMENTS

| | | |
|---|---|---|
| 5,456,983 A | 10/1995 | Sassa |
| 7,153,464 B2 | 12/2006 | Millard et al. |
| 2006/0283014 A1 | 12/2006 | Subramanian et al. |
| 2016/0305048 A1* | 10/2016 | Magdefrau ....... C04B 35/62868 |

* cited by examiner

FUGITIVE FIBER COMMINGLING TO PROVIDE LOFT IN CERAMIC FIBER TOWS

RELATED APPLICATIONS

The present patent document claims the benefit of priority under 35 U.S.C. § 119(e) to U.S. Provisional Patent Application Ser. No. 62/597,129, filed Dec. 11, 2017, and which is hereby incorporated by reference in its entirety.

TECHNICAL FIELD

This disclosure relates to ceramic fibers and, in particular, to ceramic fiber tows.

BACKGROUND

A ceramic matrix composite (CMC) may be formed from one or more fiber tows. Each fiber tow may include multiple fibers bundled together.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a ceramic fiber tow including a fugitive fiber separating the ceramic fibers of a single ceramic fiber tow as well as methods for making the same are described herein. Additionally, a ceramic matrix composite component formed from such a ceramic fiber tow is described.

As another example, a method for making a ceramic fiber tow is described herein. The method may include commingling ceramic fibers with a fugitive fiber to form a single ceramic fiber tow. The fugitive fiber may be positioned between at least two ceramic fibers included in the single ceramic fiber tow. The method may further include forming a porous ceramic preform that includes at least the single ceramic fiber tow. The method may further include removing the fugitive fiber from the ceramic fiber tow leaving a space between at least two ceramic fibers of the single ceramic fiber tow. The method may further include replacing the spaces between ceramic fibers included in the ceramic fiber tows with a ceramic matrix.

One interesting feature of the systems and methods described below may be that forming a space between ceramic fibers of a ceramic fiber tow, which is included in a porous ceramic preform, may improve the ability to infiltrate the single ceramic fiber tow during the Chemical Vapor Infiltration and/or the Melt-infiltration processes that may occur in a CMC manufacturing process. Alternatively, or in addition, an interesting feature of the systems and methods described below may be that having a more open fiber tow reduces fiber-fiber contact, thus reducing abrasion and bonding issues that typically result in low-temperature "pesting" commonly observed in CMCs.

Figure 1:
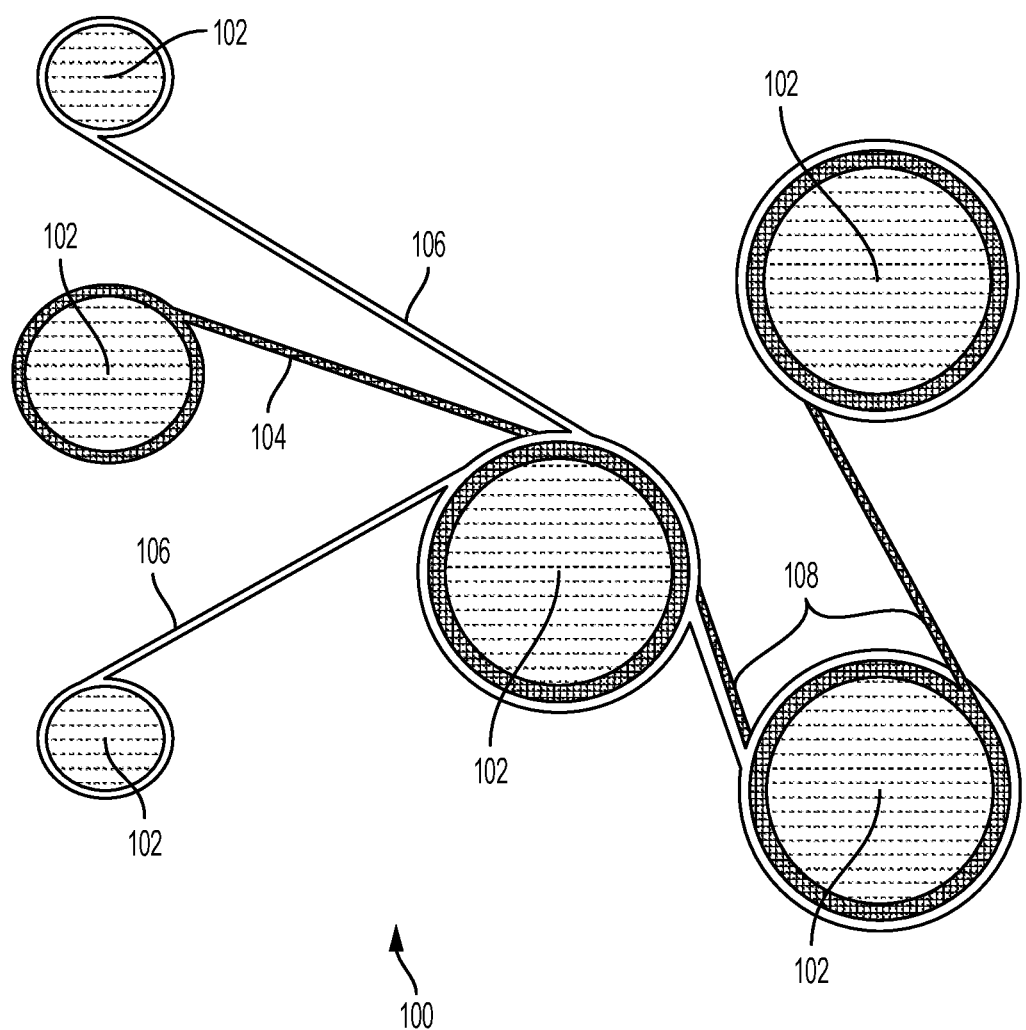
FIG. 1 illustrates an example of a system of rollers nesting together ceramic fibers and a fugitive fiber into a ceramic fiber tow.

FIG. 1 illustrates an example of a system 100 comprising rollers 102. The system 100 is configured to weave together ceramic fibers 104 and at least one fugitive fiber 106 into a ceramic fiber tow 108. The ceramic fiber tow 108 woven by the system 100 includes both the ceramic fibers 104 and the fugitive fiber 106.

The system 100 may include a series of devices configured to unspool and/or nest together fibers. For example the rollers 102 may unspool a native fiber tow (not shown), where the native fiber tow may be a yarn-like arrangement of fibers received from a third party supplier. The native fiber tow may include the ceramic fibers 104 or the fugitive fiber 106. Alternatively or in addition, the rollers 102 may nest together individual ceramic fibers 104, either from the native fiber tow or otherwise supplied, with the fugitive fiber 106, either from the native fiber tow or otherwise supplied. The rollers 102 may nest the ceramic fibers 104 together with the fugitive fiber 106 such that the fugitive fiber 106 is commingled with the ceramic fibers 104, resulting in the ceramic fiber tow 108.

The ceramic fibers 104 may include any ceramic fibers capable of withstanding the temperatures and environment for processing, for example 1000 degrees Celsius in vacuum or 500° C. in air. Examples of ceramic fibers 104 may include fibers of alumina, mullite, silicon carbide, zirconia, or carbon. The ceramic fibers 104 may not be organic or metallic.

The fugitive fiber 106 may include at least one fiber capable of being nested between the ceramic fibers 104. The fugitive fiber 106 may be a fiber that thermally decomposes at a temperature at which the ceramic fibers 104 do not thermally decompose, for example less than 800° C. Alternatively or in addition, the fugitive fiber 106 may include a material that chemically dissolves in a solvent in which the ceramic fibers 104 do not. Examples of fugitive fiber 106 may include any polymer in a family of high purity, low char-yielding polymers. For example, ash impurities should be less than 100 ppm and char yields should be less than 0.1% by weight. Examples of the high purity, low char-yielding polymer may include polyvinyl alcohol (PVA), polyethylene oxide (PEO), polyvinyl pyrrolidone (PVP), and polypropylene carbonate (PPC).

The ceramic fiber tow 108 may be a bundle of ceramic fibers 104 commingled with the fugitive fiber 106. If the fugitive fiber 106 is present in the ceramic fiber tow 108, the fugitive fiber 106 may provide loft between adjacent ceramic fibers 104. In other words, the fugitive fiber 106, by being positioned between adjacent ceramic fibers 104 in the ceramic fiber tow 108, maintains a distance (shown in FIG. 2) between the adjacent ceramic fibers 104. The commingled nature of the fugitive fiber 106 and the ceramic fibers 104 may indicate that the fugitive fiber 106 is positioned among the ceramic fibers 104 in the ceramic fiber tow 108.

As mentioned above, the ceramic fibers 104 and the fugitive fiber 106 may be nested together by the series of rollers 102. Alternatively, the ceramic fibers 104 may be commingled with the fugitive fiber 106 by air-jet texturing. The system 100 may include at least one air-jet texturing device (not shown). The air-jet texturing device may include any of a wide variety of air-jet texturing devices. The air-jet texturing device may include, for example, a hollow, cylindrical or conical body with fiber inlet and outlet ports at opposing ends of the body, one or more fluid inlet ports in a wall of the body for introducing air or other fluid, typically at high velocity, from an external source into an interior of the body and one or more channels within the interior of the body for promoting turbulence of the fluid. During operation of the system 100, for example, the ceramic fibers 104 and fugitive fiber 106 may be passed through the air-jet device and the high speed fluid entrains the ceramic fibers 104 or groups of the ceramic fibers 104 with the fugitive fiber 106 causing them to loop, whirl and/or tangle, thereby producing bulk and texture in the resulting ceramic fiber tow 108. The fluid used for texturing may be at elevated temperature both to promote stress relaxation in the entering ceramic fiber 104 and the fugitive fiber 106 and to set the texture imparted to the resulting ceramic fiber tow 108. Air-jet texturing temperatures may be adjusted to provide control over the level of bulk introduced into ceramic fibers 104 and fugitive fiber 106. In some examples, air-jet texturing temperatures of about 20° C. to about 70° C. below a melting point of the fugitive fiber 106 may be employed to prevent melting of the fugitive fiber 106 during the air-jet texturing process.

As mentioned above, the native fiber tow may be a fiber tow supplied from a third party supplier. The native fiber tows may include native fibers. The native fiber tow may include a native "sizing" on the native fiber tows. The native sizing may include a low char-yielding, high purity polymer. For example, ash impurities should be less than 100 ppm and char yields should be less than 0.1% by weight. Examples of the native sizing may include polyvinyl alcohol, polyethylene oxide, and any other suitable low char-yielding, high purity polymer. In some examples, prior to unweaving the native fiber, the sizing may be removed by thermal decomposition or chemical dissolution. The fibers supplied from the third party supplier with removed sizing may be easier to handle in future processes or systems toward forming ceramic matrix composite products, for example.

Figure 2:
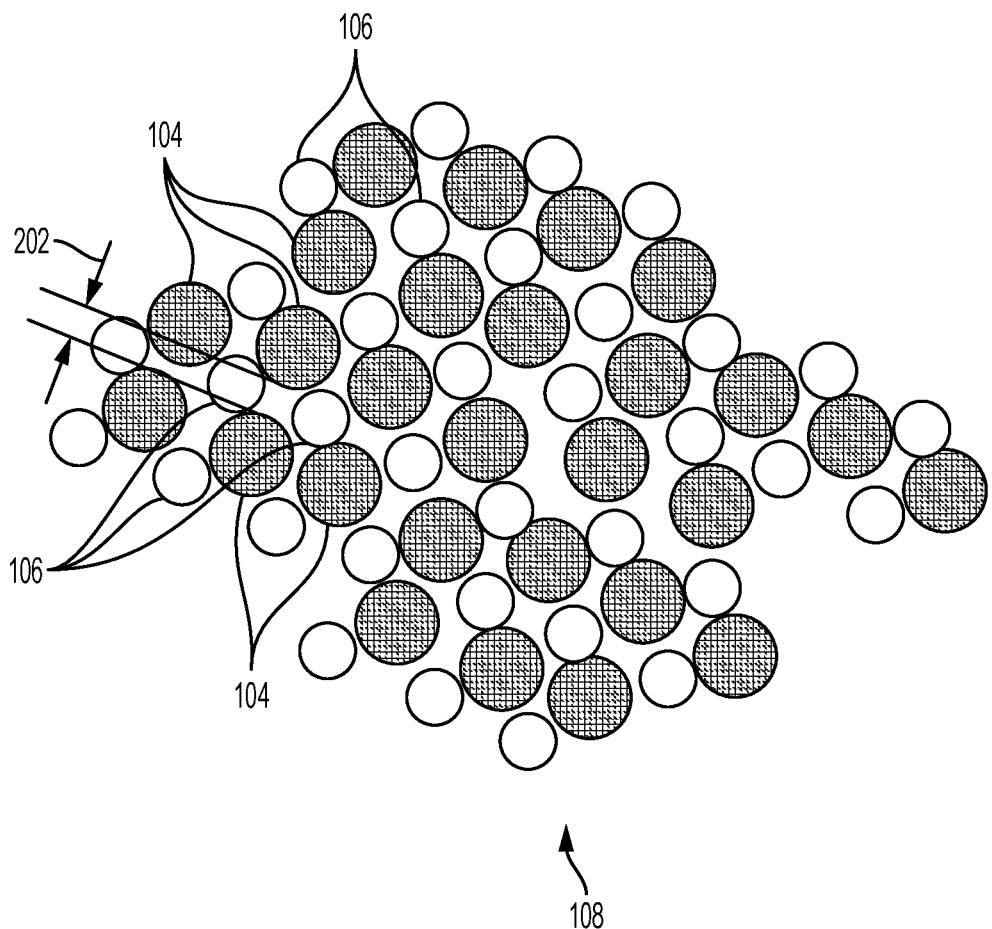
FIG. 2 illustrates a cross-sectional view of the ceramic fiber tow including the ceramic fibers commingled with the fugitive fiber.

FIG. 2 illustrates a cross-sectional view of the ceramic fiber tow 108 that includes the ceramic fibers 104 commingled with multiple fugitive fibers 106. Each of the fugitive fibers 106 may be between at least two of the ceramic fibers 104. Alternatively, one or more of the fugitive fibers may not be between at least two of the ceramic fibers 104. Alternatively or in addition, the fugitive fiber 106 may be a single fiber non-uniformly entwined throughout the ceramic fibers 104. Alternatively or in addition, the fugitive fiber 106 may be uniformly entwined in a pattern between ceramic fibers 104.

The fugitive fiber 106 may separate a first ceramic fiber 104 from a second ceramic fiber 104 by a distance 202. The distance 202 between adjacent ceramic fibers 104 in the ceramic fiber tow 108 may vary throughout the ceramic fiber tow 108. Alternatively, the distance between adjacent ceramic fibers 104 may be substantially uniform throughout the ceramic fiber tow 108. In some examples, the distance 202 separating the ceramic fibers 104 may be in a range between 0.1 μm and 200 μm. In some examples, clusters of fibers may form in which the distance 202 between ceramic fibers 106 included in a representative cluster is smaller than the distance 202 between ceramic fibers 106 not included in the representative cluster.

Figure 3:
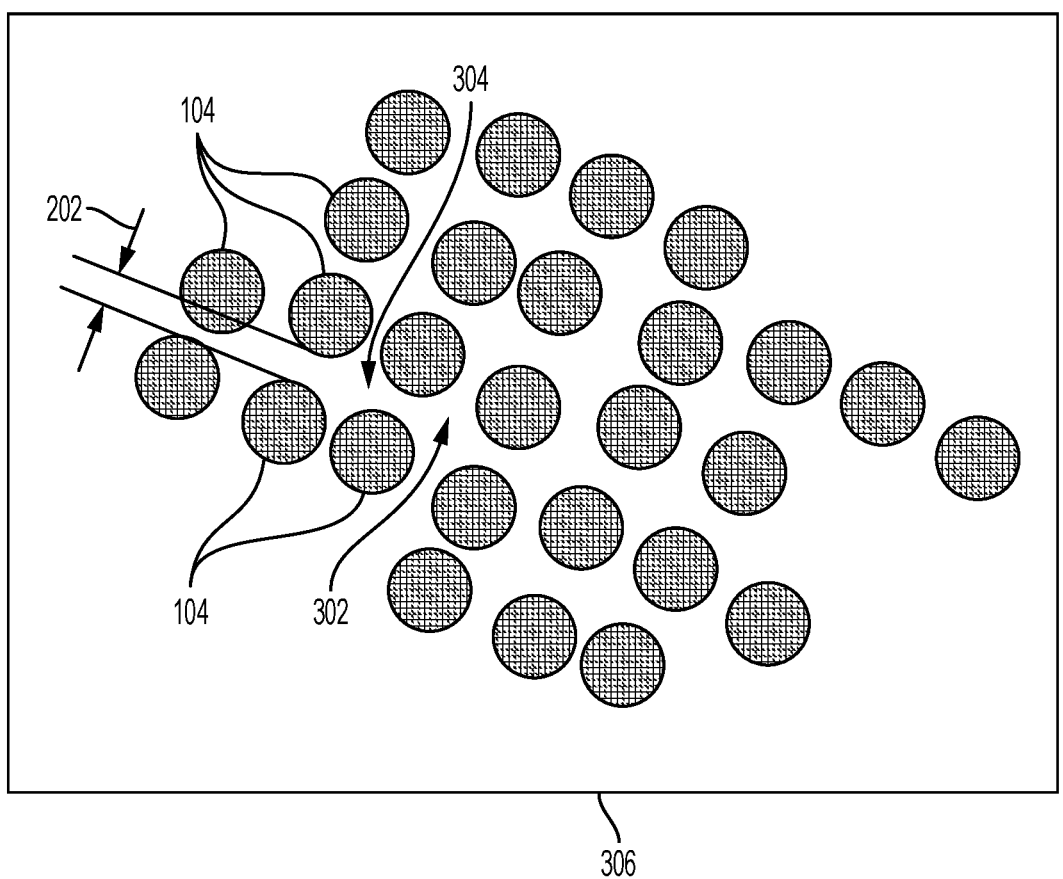
FIG. 3 illustrates a cross-sectional view of a ceramic matrix composite component including an arrangement of the ceramic fibers having the fugitive fibers removed leaving a space between the ceramic fibers.

FIG. 3 illustrates a cross-sectional view of a ceramic matrix composite component 306 including the ceramic fibers 104 after the fugitive fiber 106 has been removed. A space 302 having the distance 202 remains between pairs of adjacent ceramic fibers 104. The fugitive fiber 106 may have been removed from the ceramic fiber tow 108. In some examples, the fugitive fiber 106 may be removed from the ceramic fiber tow 108 by thermal decomposition. Alternatively or in addition, in some examples, the fugitive fiber 106 may be removed from the ceramic fiber tow 108 by chemical dissolution such as by dissolving with a solvent or reactive chemical compound. The space 302 is present as a result of a dissolution or decomposition of the fugitive fiber 106 without a corresponding dissolution or decomposition of the ceramic fibers 104.

The removal of the fugitive fiber 106 may leave the space 302. The space 302 may be a portion of the ceramic fiber tow 108 in which no ceramic fiber 104 or fugitive fiber 106 occupies. The space 302 may serve to facilitate infiltration of the ceramic fiber tow 108 by processes or systems occurring subsequently in a ceramic matrix composite manufacturing scheme. Properties of the ceramic fibers 104 within the ceramic fiber tow 108 may permit the ceramic fibers 104 to remain the distance 202 apart, even after the fugitive fiber 106 is removed. For example, frictional contact between neighboring ceramic fiber tows 108 may be sufficient to prevent movement.

A ceramic matrix material 304 may fill the space 302 in the ceramic matrix composite component 306. The ceramic matrix material 304 may include a particulate matter. Examples of ceramic matrix material 304 may include ceramic particles that become part of the ceramic matrix after Melt Infiltration. These ceramic particles may comprise silicon carbide, but they may additionally or alternatively include carbon, silicon nitride, alumina, aluminosilicate, and/or boron carbide or another refractory carbide.

Figure 4:
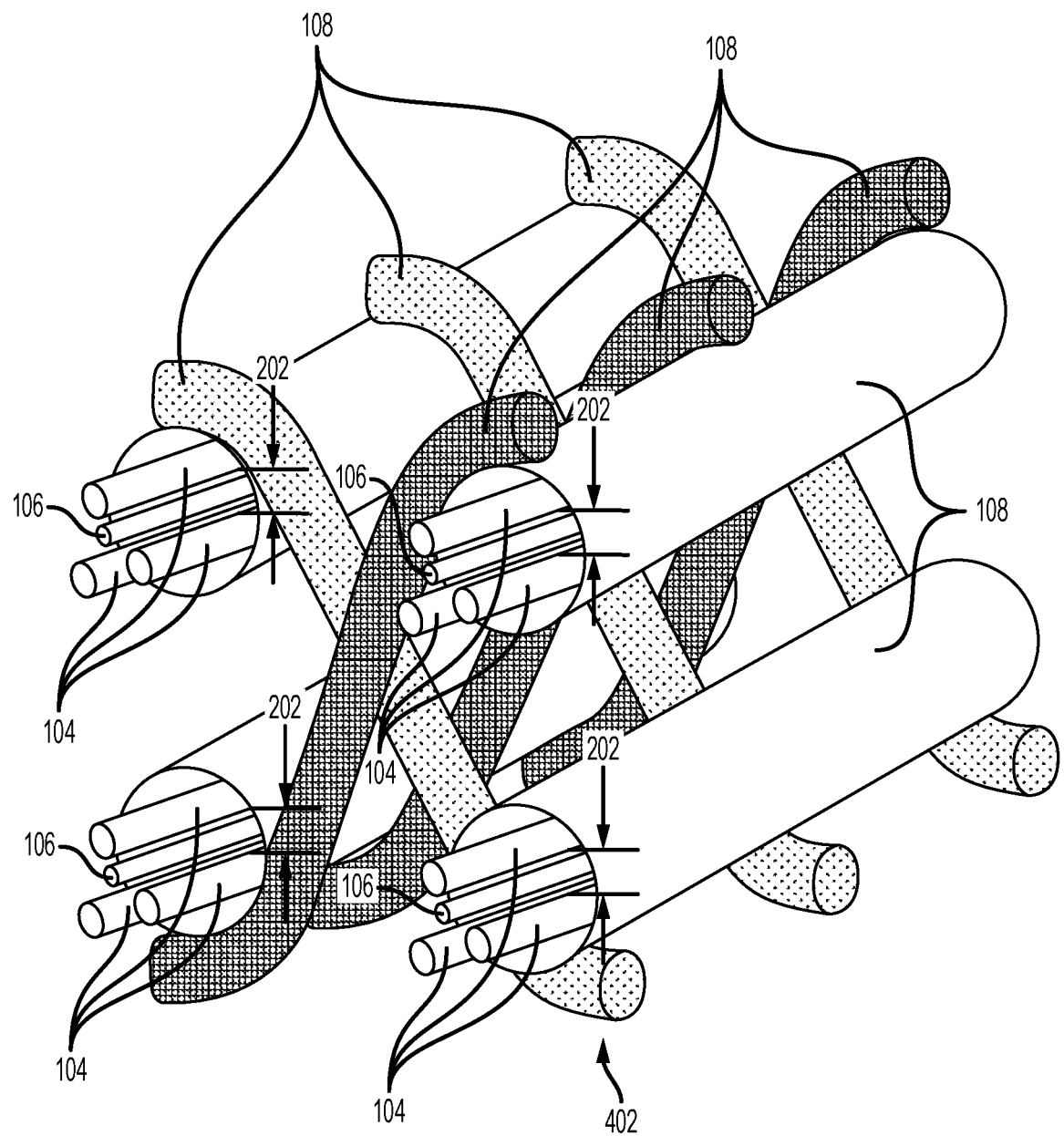
FIG. 4 shows a section of a porous ceramic preform.

FIG. 4 illustrates a section of a ceramic preform 402. One or more of the ceramic fiber tows 108 may be formed into the ceramic preform 402. The ceramic preform 402 may be an arrangement of the ceramic fiber tows 108. The arrangement may be fixed in a desired shape. The ceramic preform 402 may be porous. Examples of the ceramic preform 402 may include a three-dimensional weave of the ceramic fiber tows 108. Alternatively or in addition, the ceramic preform 402 may include a two-dimensional weave of the ceramic fibers tows 108. The ceramic preform 402 may include multiple layers of two-dimensional weave of the ceramic fiber tows 108. Alternatively or in addition, the ceramic preform 402 may include a fiber layup, such as a unidirectional layup or unidirectional tape.

The ceramic preform 402 may be subjected to a heat treatment or a chemical treatment that may result in removal or decomposition of the fugitive fiber 106 from the ceramic fiber tow 108. The ceramic preform 402 including the ceramic fiber tow 108 with the fugitive fiber 106 removed, may be subjected to processes for rigidization. In some examples, the rigidization process includes the ceramic preform 402 being placed in a high-temperature capable tool for rigidization through a process such as Chemical Vapor Infiltration. Subsequent to the Chemical Vapor Infiltration, the ceramic preform 402 may be infiltrated with a ceramic matrix slurry. Subsequent to the ceramic matrix slurry infiltration, the ceramic preform 402 may be melt infiltrated with a molten silicon or an alloy thereof to form a composite matrix component 306 (a cross-section is shown in FIG. 3). Each of the infiltration procedures described may be aided by the space 302 between each of the ceramic fibers 104 of single ceramic fiber tows 108. The infiltration steps described may be aided by the spaces 302 between each of the ceramic fibers 104 of the single ceramic fiber tow 108.

Figure 5:
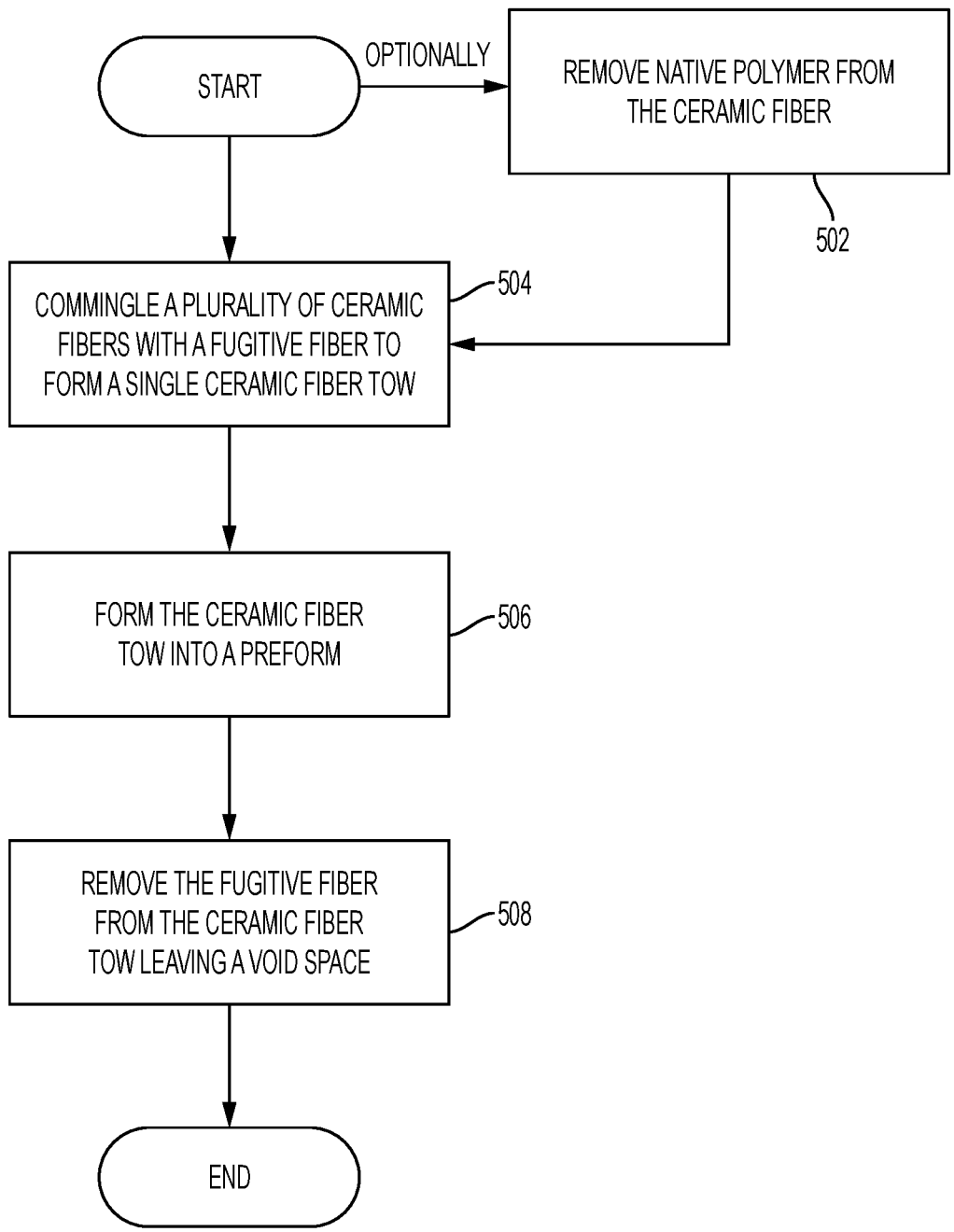
FIG. 5 is a flowchart describing a method of making the ceramic fiber tow.

FIG. 5 illustrates a flow diagram of an example method to form a ceramic fiber tow 108 including commingled ceramic fibers 104 and fugitive fiber 106. The method may include additional, different, or fewer operations than illustrated in FIG. 5. The operations may be executed in a different order than illustrated in FIG. 5.

In some examples, as mentioned above, the ceramic fiber 104 and/or the fugitive fiber 106 may be received from third party suppliers in native ceramic fiber tows or native fugitive fiber tows, respectively. In some examples, the native ceramic fiber tows include the native "sizing." The native sizing may include a polymer or binder.

Operations may begin, in some examples, by removing (502) the native sizing from the native ceramic fiber tows resulting in de-sized ceramic fiber tows including de-sized ceramic fibers 104. The de-sized ceramic fiber tows may be unspooled by the rollers 102, separating individual ceramic fibers 104.

Operations may include commingling (504) the ceramic fibers 104 with the fugitive fiber 106 to form a single ceramic fiber tow 108 that includes the ceramic fibers 104 and the fugitive fiber 106. As mentioned above, the commingling (504) of the ceramic fibers 104 with the fugitive fiber 106 may include commingling the ceramic fibers 104 with the fugitive fiber 106 by feeding the fibers 104 and 106 through the series of rollers 102. Alternatively or in addition, the commingling (504) of the ceramic fibers 104 with the fugitive fiber 106 may include air-jet texturing. The commingling (504) of the ceramic fibers 104 with the fugitive fiber 106 may result in forming the ceramic fiber tow 108. The ceramic fiber tow 108 may include the fugitive fiber 106 positioned between at least two ceramic fibers 104 in the respective single ceramic fiber tow 108. In some examples, the ceramic fiber tow 108 includes the ceramic fiber 104 and fugitive fiber 106 in a ratio of between 1:0.05 and 1:2, by volume.

Operations may further include forming (506) the ceramic preform 402. The porous ceramic preform may include at least one of the ceramic fiber tows 108. The porous ceramic preform may include any predetermined shape or configuration of ceramic fiber tows 108.

Operations may end by, for example, removing (508) the fugitive fiber 106 from the ceramic fiber tow 108. In some examples, removing (508) the fugitive fiber 106 from the ceramic fiber tow 108 may include thermally decomposing the fugitive fiber. Alternatively or in addition, removing (508) the fugitive fiber 106 from the ceramic fiber tow 108 may include dissolving the fugitive fiber. Removing (508) the fugitive fiber 106 from the ceramic tow 108 may leave the space 302. In some examples, the space 302 left by removing (508) the fugitive fiber 106 may include the distance 202 between two adjacent ceramic fibers 104. The distance 202 may be between 0.1 and 200 μm.

The logic illustrated in the flow diagrams may include additional, different, or fewer operations than illustrated. The operations illustrated may be performed in an order different than illustrated.

For example, the operations may additionally include melt infiltrating the ceramic preform 402. As a result of the melt infiltration, the space 302 may be filled or partially filled with the ceramic matrix slurry.

Alternatively or in addition, operations may include forming the ceramic fiber tow 108 into a uni-directional tape. Alternatively or in addition, operations may include forming the ceramic fiber tow 108 into a 2-dimensional weave. The 2-dimensional weave may include fibers running in at least two distinct directions. Alternatively or in addition, operations may include forming the ceramic fiber tow 108 into a 3-dimensional weave. The 3-dimensional weave may include fibers running in at least 3 distinct directions.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A method comprising:
   commingling a plurality of ceramic fibers with a fugitive fiber to form a ceramic fiber tow, the fugitive fiber positioned between at least two ceramic fibers of the ceramic fiber tow;
   forming a porous ceramic preform comprising at least the ceramic fiber tow; and
   removing the fugitive fiber from the ceramic fiber tow leaving a space between the at least two ceramic fibers of the ceramic fiber tow.
2. The method of aspect 1, further comprising removing a native polymer from the ceramic fibers.
3. The method of aspect 2, wherein removing the native polymer from the ceramic fibers comprises thermally decomposing the native polymer.
4. The method of any of aspects 2 or 3, wherein removing the native polymer from the ceramic fibers comprises dissolving the native polymer.
5. The method of any of aspects 1 to 4, wherein commingling the ceramic fibers with the fugitive fiber comprises rolling the ceramic fibers and the fugitive fiber through a series of rollers.
6. The method of any of aspects 1 to 5, wherein commingling the plurality of ceramic fibers with the fugitive fiber is carried out with a ratio of ceramic fibers to fugitive fiber is between 1:0.05 and 1:2 by volume.
7. The method of any of aspects 1 to 6, wherein the commingling the ceramic fibers with the fugitive fiber comprises air-jet texturing.
8. The method of any of aspects 1 to 7, wherein the removing the fugitive fiber from the ceramic fiber tow comprises thermally decomposing the fugitive fiber.
9. The method of any of aspects 1 to 8, wherein removing the fugitive fiber from the ceramic fiber tow comprises dissolving the fugitive fiber.
10. The method of any of aspects 1 to 9, wherein removing the fugitive fiber from the ceramic fiber tow leaving a space between the at least two ceramic fibers of the single ceramic fiber tow comprises positioning each of the ceramic fibers a distance apart from each other ceramic fiber, the distance being between 0.1 μm and 200 μm.

11. The method of any of aspects 1 to 10, further comprising forming the ceramic fiber tow into a uni-directional tape.
12. The method of any of aspects 1 to 11, further comprising replacing the space between the at least two ceramic fibers of the single ceramic fiber tow, at least in part, by a ceramic matrix.
13. The method of any of aspects 1 to 12, further comprising forming the ceramic matrix composite body by infiltrating the porous ceramic preform, including the ceramic fiber tow, with chemical vapor infiltration.
14. A ceramic fiber tow comprising:
  a plurality of ceramic fibers; and
  a fugitive fiber positioned among the ceramic fibers of the ceramic fiber tow, the fugitive fiber removable by at least one of a dissolution or a thermal decomposition without a corresponding dissolution or decomposition of the ceramic fibers.
15. The ceramic fiber tow of any of aspects 14, wherein each ceramic fiber is separated from each other ceramic fiber by a distance of between 0.1 μm and 200 μm.
16. The ceramic fiber tow of any of aspects 14 to 15, wherein the fugitive fiber comprises at least one of polyvinyl alcohol, polyethylene oxide, polyvinyl pyrrolidone, or polypropylene carbonate.
17. The ceramic fiber tow of any of aspects 14 to 16, wherein the ceramic fibers comprise at least one of polyvinyl alcohol or polyethylene oxide.
18. The ceramic fiber tow of any of aspects 14 to 17, wherein each ceramic fiber is separated from one or more other of the ceramic fibers by a distance, the distance being uniform throughout the ceramic fiber tow.
19. A ceramic matrix composite component comprising:
  a ceramic fiber tow comprising a plurality of ceramic fibers, wherein each of the ceramic fibers is separated from each other ceramic fiber by a distance between 0.1 μm and 200 μm.
20. The ceramic matrix composite component of any of aspect 19, wherein the ceramic fibers comprise at least one of alumina, mullite, silicon carbide, zirconia, or carbon.

What is claimed is:
1. A method comprising:
  commingling a plurality of ceramic fibers with a fugitive fiber to form a ceramic fiber tow, the fugitive fiber positioned between at least two ceramic fibers of the ceramic fiber tow;
  forming a porous ceramic preform comprising at least the ceramic fiber tow;
  removing the fugitive fiber from the ceramic fiber tow leaving a space between the at least two ceramic fibers of the ceramic fiber tow;
  infiltrating the porous ceramic preform to form a ceramic matrix composite component, the infiltrating comprising chemical vapor infiltration and/or melt infiltration, and replacing the space between the at least two ceramic fibers of the single ceramic fiber tow at least in part by a ceramic matrix.
2. The method of claim 1, further comprising removing a native polymer from the ceramic fibers.
3. The method of claim 2, wherein removing the native polymer from the ceramic fibers comprises thermally decomposing the native polymer.
4. The method of claim 2, wherein removing the native polymer from the ceramic fibers comprises dissolving the native polymer.
5. The method of claim 1, wherein commingling the ceramic fibers with the fugitive fiber comprises rolling the ceramic fibers and the fugitive fiber through a series of rollers.
6. The method of claim 1, wherein commingling the plurality of ceramic fibers with the fugitive fiber is carried out with a ratio of ceramic fibers to fugitive fiber is between 1:0.05 and 1:2 by volume.
7. The method of claim 1, wherein the commingling the ceramic fibers with the fugitive fiber comprises air-jet texturing.
8. The method of claim 1, wherein the removing the fugitive fiber from the ceramic fiber tow comprises thermally decomposing the fugitive fiber.
9. The method of claim 1, wherein removing the fugitive fiber from the ceramic fiber tow comprises dissolving the fugitive fiber.
10. The method of claim 1, wherein removing the fugitive fiber from the ceramic fiber tow leaving a space between the at least two ceramic fibers of the single ceramic fiber tow comprises positioning each of the ceramic fibers a distance apart from each other ceramic fiber, the distance being between 0.1 μm and 200 μm.
11. The method of claim 1, further comprising forming the ceramic fiber tow into a uni-directional tape.

* * * * *